(12) United States Patent
Wang et al.

(10) Patent No.: US 7,940,452 B2
(45) Date of Patent: May 10, 2011

(54) METHOD FOR ACQUIRING SPECTRUM SHAPE OF A GAIN FLATTENING FILTER IN AN OPTICAL AMPLIFIER

(75) Inventors: Zhigang Wang, Shenzhen (CN); Aihua Yu, Shenzhen (CN)

(73) Assignee: O-Net Communications (Shenzhen) Limited, Shenzhen (CN)

( * ) Notice: Subject to any disclaimer, the term of this patent is extended or adjusted under 35 U.S.C. 154(b) by 274 days.

(21) Appl. No.: 12/195,864

(22) Filed: Aug. 21, 2008

(65) Prior Publication Data
US 2009/0052015 A1 Feb. 26, 2009

(30) Foreign Application Priority Data
Aug. 22, 2007 (CN) .................. 2007 1 0145165

(51) Int. Cl.
*H04B 10/17* (2006.01)
*H04B 10/12* (2006.01)
(52) U.S. Cl. .............. 359/337.1; 359/337.2; 359/337.21
(58) Field of Classification Search ................ 359/337.1, 359/337.2, 337.21
See application file for complete search history.

(56) References Cited

U.S. PATENT DOCUMENTS

| 5,724,652 | A | | 3/1998 | Graham et al. | |
|---|---|---|---|---|---|
| 5,838,487 | A | * | 11/1998 | Nilsson et al. | 359/337.12 |
| 6,424,456 | B1 | * | 7/2002 | Lee et al. | 359/337 |
| 6,498,676 | B1 | * | 12/2002 | Zimmerman et al. | 359/337.1 |
| 6,529,328 | B1 | * | 3/2003 | Cheng et al. | 359/578 |
| 2005/0031356 | A1 | * | 2/2005 | Suzuki et al. | 398/149 |

* cited by examiner

*Primary Examiner* — Eric Bolda
(74) *Attorney, Agent, or Firm* — Tim Tingkang Xia; Morris, Manning & Martin, LLP

(57) ABSTRACT

A method for acquiring spectrum shape of a gain flattening filter of a doped optical fiber amplifier comprises the steps of: measuring spectrum shapes at two gain point (H, L) of the doped optical fiber with invariable fiber length respectively; and acquiring various gain spectrums of the doped optical fiber with various fiber length and various population inversion level according to an expression:

$$ErGain(\lambda, x, L') = [ErLGain(\lambda) + [ErHGain(\lambda) - ErLGain(\lambda)]*x]*L',$$

Wherein Gain($\lambda$) refers to the spectral function of gain, x is $\Delta'inv/\Delta inv$ which refers to change of population inversion level, and L' is set as proportion of doped fiber length. Gain spectrums of the doped optical fiber with various fiber length can be acquired by measuring spectrum shapes at two gain point (H, L) of the doped optical fiber in invariable fiber length and applying change rule of gain spectrum of the doped optical fiber in different population inversion level, which improves the flexibility for design of amplifier.

9 Claims, 3 Drawing Sheets

METHOD FOR ACQUIRING SPECTRUM SHAPE OF A GAIN FLATTENING FILTER IN AN OPTICAL AMPLIFIER

FIELD OF THE INVENTION

The invention is related to optical communication systems, in particular to a method for acquiring spectrum shape of a gain flattening filter in a doped optical fiber amplifier applied to an optical fiber communication system.

BACKGROUND OF THE INVENTION

The optical fiber amplifier, especially Erbium-doped optical fiber amplifier (EDFA), has already become one of the key parts of optical communication systems. EDFA has given great impetus to the development of wavelength division multiplexing systems since it came into being. However, as WDM systems increase in capacity and rate, the gain unflatness in EDFA is obviously affecting the system performance.

Generally, there are two methods to flatten the gain in EDFA. One is to add a gain flattening filter (GFF) to EDFA. The other is to change the basic material of Erbium-doped optical fiber or to add other materials to the Erbium-doped optical fiber. But generally, before the amplifier is designed, the basic and doped material of Erbium-doped optical fiber has been predetermined, so the gain flattening filter (GFF) is generally used for flattening the gain in the design.

The gain flattening filter (GFF) can be placed in a flexible position. It can be placed before or after all of the gain stages. If there are two or more gain stages available, it can be put between any two gain stages; even several gain flattening filters (GFF) can be placed respectively. However, no matter where the gain flattening filter is placed, the spectrum shape of gain flattening filter (GFF) is designed so as to achieve a good performance of gain flatness.

However, the existing test methods are only restricted to GFF spectrum shape under a given length of optical doped fiber and a specific level of population inversion.

SUMMARY OF THE INVENTION

One embodiment of the present invention provides a method for acquiring spectrum shape of a gain flattening filter in an doped optical fiber amplifier. The method includes the steps of: measuring spectrum shapes at two gain points (H, L) of the doped optical fiber with invariable doped fiber lengths respectively; and acquiring various gain spectrums of the doped optical fiber with various doped fiber lengths and various population inversion level according to an expression, and acquiring corresponding shape of a gain flattening filter:

ErGain($\lambda$,x,L')=[ErLGain($\lambda$)+[ErHGain($\lambda$)−ErLGain($\lambda$)]*x]*L';

Wherein Gain($\lambda$) refers to the spectral function of gain, x is $\Delta'$inv/$\Delta$inv which refers to change of population inversion level, and L' is set as proportion of doped fiber length.

The method comprises the steps of: adjusting an input spectrum and testing the input spectrum; measuring the passive loss spectrum of the module; splicing an Erbium-doped fiber to the optical fiber amplifier and forming an Erbium-doped fiber amplifier, adjusting the pump power to make the module gain close to the target gain, and measuring the module gain spectrum at two population inversion levels (H, L); calculating the gain of Erbium-doped fiber amplifier according to Formulas:

ErHGain($\lambda$)=ModuleHGain($\lambda$)+PassiveLoss($\lambda$) and

ErLGain($\lambda$)=ModuleLGain($\lambda$)+PassiveLoss($\lambda$);

adjusting Erbium-doped fiber length and population inversion coefficient x, and acquiring various gain spectrums of the doped optical fiber with various corresponding fiber lengths according to Formula:

ErGain($\lambda$,x,L')=[ErLGain($\lambda$)+[ErHGain($\lambda$)−ErLGain($\lambda$)]*x]*L'; and Subtracting minimum gain from gain spectrum of the doped optical fiber, and then acquiring a spectrum shape of the gain flattening filter corresponding to a doped fiber length.

Another embodiment of the present invention provides a method for acquiring spectrum shape of a gain flattening filter in a doped optical fiber amplifier, the method includes the steps of: adjusting an input spectrum and testing the input spectrum; splicing an Erbium-doped fiber to the optical fiber amplifier and forming an Erbium-doped fiber amplifier, adjusting the pump power to make the module gain close to the target gain, and measuring the module gain spectrum at two population inversion levels (H, L); removing the Erbium-doped fiber and measuring the passive loss spectrum of the gain flattening filter and the optical fiber amplifier;

calculating the gain of the Erbium-doped fiber amplifier according to Formulas:

ErHGain($\lambda$)=ModuleHGain($\lambda$)+PassiveLoss($\lambda$) and

ErLGain($\lambda$)=ModuleLGain($\lambda$)+PassiveLoss($\lambda$);

adjusting different Erbium-doped fiber lengths and population inversion coefficient x, and acquiring various gain spectrums of the doped optical fiber with various corresponding fiber lengths according to Formula:

ErGain($\lambda$,x,L')=[ErLGain($\lambda$)+[ErHGain($\lambda$)−ErLGain($\lambda$)]*x]*L'; and Subtracting minimum gain from gain spectrum of the doped optical fiber, and then acquiring a spectrum shape of the gain flattening filter corresponding to a doped fiber length.

Gain spectrums of the doped optical fiber with various doped fiber lengths can be acquired by measuring spectrum shapes at two gain points (H, L) of the doped optical fiber in invariable fiber lengths and applying change rule of gain spectrum of the doped optical fiber in different population inversion levels, which improves the flexibility for design of amplifier.

First of all, the method of the present invention can calculate the spectrum shape of gain flattening filter (GFF) relevant to any doped fiber length. In the course of design of EDFA, the length of doped optical fiber is an important parameter which exerts a direct effect on such key parameters as noise figure and pump conversion efficiency, etc. Among them, the noise figure is a key parameter for the performance of the amplifier, and determines the degradation of signal to noise ratio after the signal passes through the amplifier. In addition, the degradation of signal to noise ratio gives a direct influence on the bit error rate of the optical communication system. The pump conversion efficiency determines the power of pump necessary for the output power required. If pump conversion efficiency becomes higher, the pump power required for the same output power would be less. Furthermore, the pump power contributes the main part of the cost of the amplifier, so during design of amplifier, the pump power is crucial for cost control. If the methods of this invention are adopted, GFF spectrum shape could be acquired given any length of doped fiber, which can improve the flexibility for design of amplifier to a great extent so that the designer can focus on improvement in noise figure and pump conversion efficiency while adjusting the length of the doped fiber.

Furthermore, this invention provides flexible methods not only for determining the length of fiber, but also for designing the shape of GFF. Flexible GFF spectrum shapes carry the following meanings: first, the spectrum shape of GFF can affect the noise figure of amplifier. Second, it may exert an influence on the pump conversion efficiency. The meaning of the above two points for design of amplifier has been described in the above parts.

Third, it can make the newly-designed amplifier match with the existing or other spectrum shapes, which is able to save on the cost of the GFF. Fourth, the methods specified in this invention can be used to evaluate whether other GFF can be applied for the modules designed currently, which is also one way of aiding the design.

DETAILED DESCRIPTION OF THE INVENTION

Figure 1:
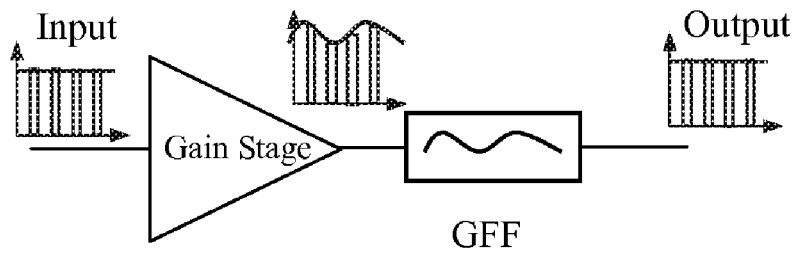
FIG. 1 is a schematic diagram of an optical path of a typical optical amplifier with a gain flattening filter (GFF), showing transforming processes of spectrum shape in the optical path.

Referring to the figures, the following gives a description about flexible design methods of gain flattening filter (GFF) applied to an optical fiber amplifier in accordance with the present invention.

First, an introduction to the theoretical basis of the present invention set forth below, namely theories related to Erbium-doped fiber gain spectrum. Given a invariable level of population inversion, the expression of gain spectrum of an Erbium-doped optical fiber with invariable length is as follows:

$$\text{ErGain}(\lambda) = [g(\lambda)*\text{inv} - \text{alpha}(\lambda)*(1-\text{inv})]*L \qquad (1)$$

In the above expression, Gain(λ) refers to the spectral function of gain, g(λ) is the spectral function of emission coefficient, alpha(λ) is the spectral function of absorption coefficient, inv refers to the population inversion level in Erbium-doped fiber, and L is the length of Erbium-doped optical fiber.

For a ready-made amplifier, the module gain is equal to Erbium-doped optical fiber gain minus the passive loss:

$$\text{ModuleGain}(\lambda) = \text{ErGain}(\lambda) - \text{PassiveLoss}(\lambda) \qquad (2)$$

equal to:

$$\text{ErGain}(\lambda) = \text{ModuleGain}(\lambda) + \text{PassiveLoss}(\lambda) \qquad (3)$$

PassiveLoss(λ) is generally invariable. To get PassiveLoss (λ), all of main optical paths shall be spliced without the Erbium-doped optical fiber, Then, PassiveLoss(λ) of optical amplifier module can be measured.

After PassiveLoss(λ) is achieved, the Erbium-doped fiber can be spliced, and the gain spectrum of the module can be tested with OSA (optical spectrum analyzer): 1. connecting the input light to the OSA, scanning the input optical spectrum; 2. connecting the input light to the input port of the module and connecting the output port of the module to the OSA; 3. scanning the output optical spectrum.

To adopt the methods specified in this invention, it is necessary to measure the two module gain spectrums near the target gain. The two module gain spectrums is respectively referred to as ModuleHGain(λ) and ModuleLGain(λ). Two gain spectrums of Erbium-doped fiber can be achieved according to Expression (3):

$$\text{Er}H\text{Gain}(\lambda) = \text{Module}H\text{Gain}(\lambda) + \text{PassiveLoss}(\lambda) \qquad (4)$$

$$\text{Er}L\text{Gain}(\lambda) = \text{Module}L\text{Gain}(\lambda) + \text{PassiveLoss}(\lambda) \qquad (5)$$

$$\text{Er}H\text{Gain}(\lambda) = [g(\lambda)*\text{inv}H - \text{alpha}(\lambda)*(1-\text{inv}H)]*L \qquad (6)$$

$$\text{Er}L\text{Gain}(\lambda) = [g(\lambda)*\text{inv}L - \text{alpha}(\lambda)*(1-\text{inv}L)]*L \qquad (7)$$

Expression(6) minus expression(7), which is equal to:

$$\text{Er}H\text{Gain}(\lambda) - \text{Er}L\text{Gain}(\lambda) = g(\lambda)(\text{inv}H - \text{inv}L) + \text{alpha}(\lambda)(\text{inv}H - \text{inv}L) \qquad (8)$$

Therefore, the relationship between the variation in gain spectrum and the variation in population inversion level is achieved as follows:

$$\Delta\text{ErGain}(\lambda) = [G(\lambda) + \text{alpha}(\lambda)]*\Delta\text{inv} = K(\lambda)*\Delta\text{inv} \qquad (9)$$

When population inversion level changes by Δ'inv, the amount of variation in gain spectrum of Erbium-doped fiber is as follows:

$$\Delta\text{ErGain}(\lambda) = K(\lambda)*\Delta'\text{inv} = \Delta\text{ErGain}(\lambda)*\Delta'\text{inv}/\Delta\text{inv} = [\text{Er}H\text{Gain}(\lambda) - \text{Er}L\text{Gain}(\lambda)]*x \qquad (10)$$

In the above expression, x is Δ'inv/Δinv. If L' is assumed as the proportion of doped fiber length, the gain in Erbium-doped fiber can be gotten regardless of length of doped fiber and variation of population inversion level:

$$\text{ErGain}(\lambda,x,L') = [\text{Er}L\text{Gain}(\lambda) + [\text{Er}H\text{Gain}(\lambda) - \text{Er}L\text{Gain}(\lambda)]*x]*L' \qquad (11)$$

Figure 5:
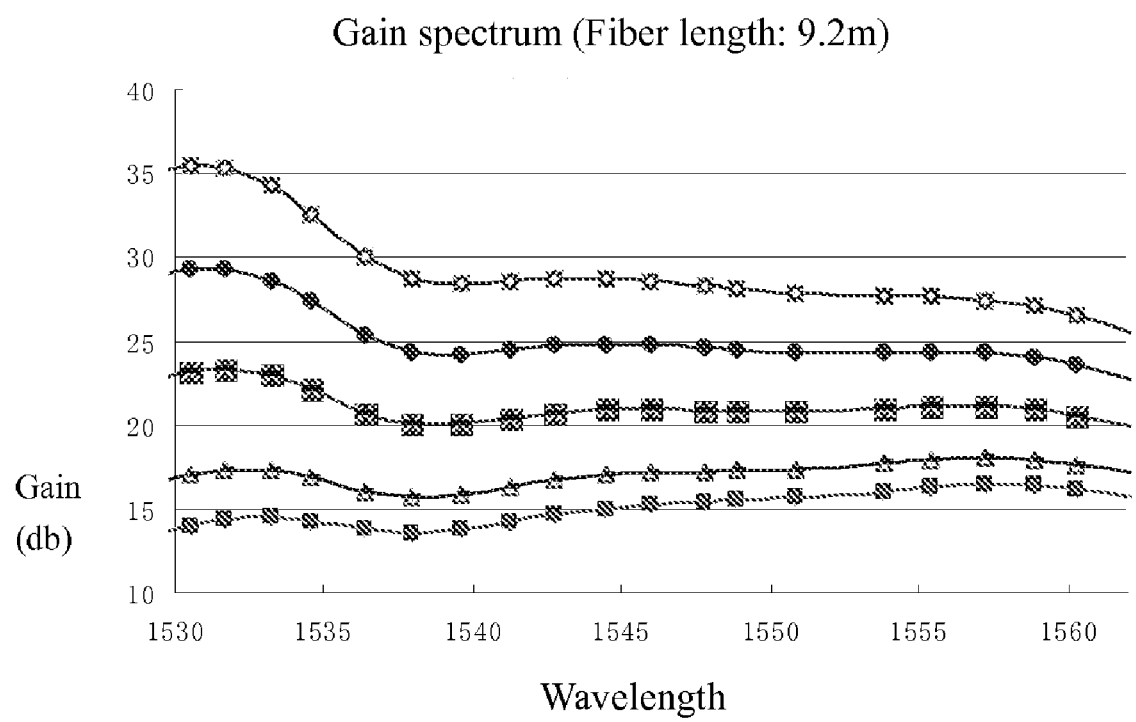
FIG. 5 illustrates variation of gain spectrums of the optical fiber amplifiers correlated with corresponding variation of population inversion level based on a constant optical doped fiber length.
Figure 6:
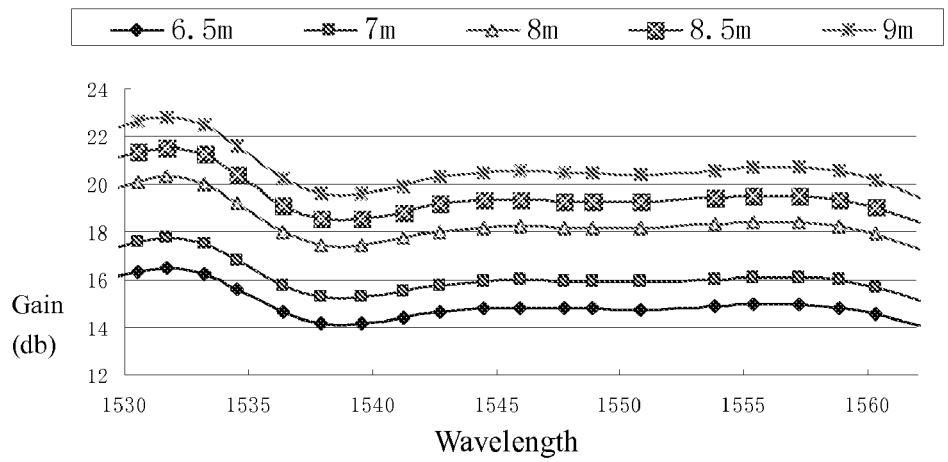
FIG. 6 illustrates various gain spectrums in optical fiber amplifiers with different doped fiber length based on a constant population inversion level.
Figure 7:
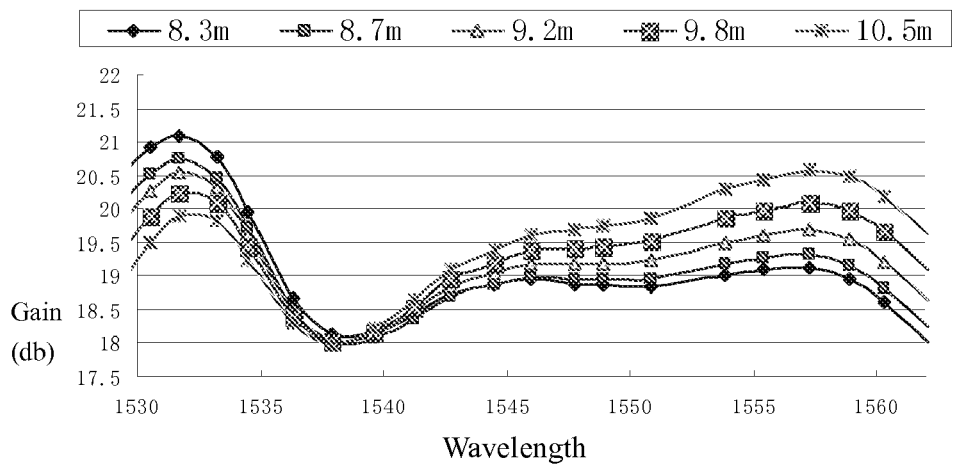
FIG. 7 illustrates various gain spectrums in optical fiber amplifiers with different doped fiber length based on a target gain, which shows a series of spectrum shape for determining a gain flattening filter (GFF)
Figure 8:
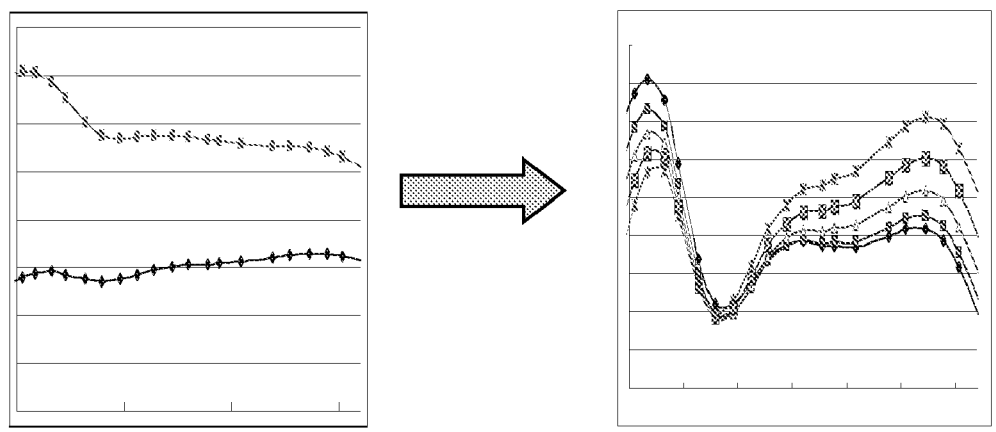
FIG. 8 illustrates spectrum shape of the gain flattening filter (GFF) corresponding to the gain of the optical fiber amplifier shown in FIG. 7.

If the length of doped fiber is fixed, a series of spectral shapes as shown in FIG. 5 can be gotten by adjusting the population inversion level. This figure shows the Erbium-doped fiber gain spectrum shapes which are gotten by adjusting the pump power when the length of doped fiber is fixed. If the population inversion level is invariable, the gain spectrum shapes corresponding to different doped fiber length are shown in FIG. 6. FIG. 7 shows the application results of this invention, namely when both the doped fiber length and the population inversion level are adjusted in the mean time, for each doped fiber length, population inversion level can be found accordingly, which can make the minimum point of gain spectrum reach the target gain. In this way, a group of population inversion level corresponding to the doped fiber length can be found. Furthermore, a group of insertion loss spectrum of gain flattening filter (GFF) also can be found necessary for achieving the target gain.

Figure 3:
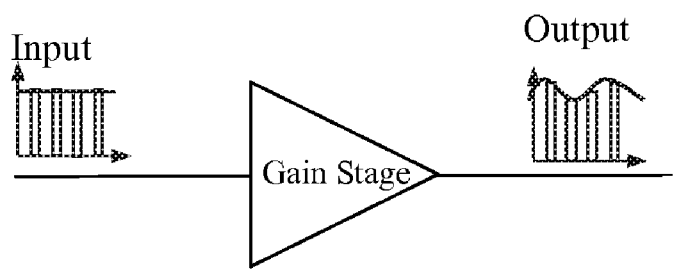
FIG. 3 illustrates an optical path for analyzing spectrum shape of a gain flattening filter (GFF) in the optical amplifier shown in FIG. 1 in accordance with the present invention.

FIG. 1 is the optical path diagram applied for a first embodiment of this invention. FIG. 3 is the corresponding optical path structure and testing points of GFF spectrum shape. This is the simplest structure of optical fiber amplifier for GFF, including a pump, an optical doped fiber and a GFF.

The pumping methods of the pump are forward or backward. The Erbium-doped fiber is one of commonly-used doped fibers. GFF can be placed before (the signal light pass through GFF and then through the doped fiber) or after the doped fiber (the signal light pass through the doped fiber and then through GFF). The method to use this invention is to measure the spectrum shapes at two gain point (H, L), to get a series of GFF spectrum shapes corresponding to the target gain. In order to describe the data processing methods in detail, a description is given as follows according to actual data:

adjusting the input spectrum and testing the flattening input spectrum as shown in Table 1:

TABLE 1

| Input signal power | |
|---|---|
| Wavelength (nm) | Input signal (dB) |
| 1529.50 | −18.18 |
| 1530.51 | −18.22 |
| 1531.68 | −18.23 |
| 1533.25 | −18.21 |
| 1534.52 | −18.20 |
| 1536.39 | −18.17 |
| 1537.91 | −18.21 |
| 1539.60 | −18.27 |
| 1541.24 | −18.24 |
| 1542.72 | −18.24 |
| 1544.48 | −18.26 |
| 1545.98 | −18.22 |
| 1547.76 | −18.20 |
| 1548.88 | −18.20 |
| 1550.81 | −18.20 |
| 1553.85 | −18.21 |
| 1555.41 | −18.24 |
| 1557.24 | −18.24 |
| 1558.88 | −18.17 |
| 1560.29 | −18.19 |
| 1562.05 | −18.21 |

First of all, measure the passive loss of modules, and then splice all of main optical paths without the Erbium-doped fiber. The results measured in this case are shown in Table 2:

TABLE 2

| Passive loss | |
|---|---|
| Wavelength (nm) | Passive loss (dB) |
| 1529.50 | 1.46 |
| 1530.51 | 1.46 |
| 1531.68 | 1.45 |
| 1533.25 | 1.42 |
| 1534.52 | 1.40 |
| 1536.39 | 1.41 |
| 1537.91 | 1.41 |
| 1539.60 | 1.36 |
| 1541.24 | 1.36 |
| 1542.72 | 1.37 |
| 1544.48 | 1.39 |
| 1545.98 | 1.41 |

TABLE 2-continued

| Passive loss | |
|---|---|
| Wavelength (nm) | Passive loss (dB) |
| 1547.76 | 1.39 |
| 1548.88 | 1.42 |
| 1550.81 | 1.42 |
| 1553.85 | 1.40 |
| 1555.41 | 1.37 |
| 1557.24 | 1.41 |
| 1558.88 | 1.41 |
| 1560.29 | 1.40 |
| 1562.05 | 1.42 |

After the passive loss is measured, splice the Erbium-doped fiber to the corresponding position of main optical paths. In this case 9.2 Erbium-doped fiber is adopted. Adjust the pump power to make the module gain close to the target gain, and measure the module gain spectrum at two level of population inversion (relevant to two pump powers, namely 46 mW and 100 mW). The data is shown in Tables 3 and 4:

TABLE 3

| Module gain of 46 mW pump | |
|---|---|
| Wavelength (nm) | Module gain (dB) |
| 1529.50 | 16.57 |
| 1530.51 | 18.46 |
| 1531.68 | 18.77 |
| 1533.25 | 18.65 |
| 1534.52 | 18.05 |
| 1536.39 | 17.08 |
| 1537.91 | 16.74 |
| 1539.60 | 16.90 |
| 1541.24 | 17.25 |
| 1542.72 | 17.64 |
| 1544.48 | 17.87 |
| 1545.98 | 18.05 |
| 1547.76 | 18.08 |
| 1548.88 | 18.11 |
| 1550.81 | 18.20 |
| 1553.85 | 18.52 |
| 1555.41 | 18.64 |
| 1557.24 | 18.74 |
| 1558.88 | 18.64 |
| 1560.29 | 18.35 |
| 1562.05 | 17.82 |

TABLE 4

| Module gain of 100 mW pump | |
|---|---|
| Wavelength (nm) | Module gain (dB) |
| 1529.50 | 22.12 |
| 1530.51 | 22.49 |
| 1531.68 | 22.69 |
| 1533.25 | 22.31 |
| 1534.52 | 21.38 |
| 1536.39 | 19.87 |
| 1537.91 | 19.23 |
| 1539.60 | 19.28 |
| 1541.24 | 19.56 |
| 1542.72 | 19.89 |
| 1544.48 | 20.01 |
| 1545.98 | 20.07 |
| 1547.76 | 20.00 |
| 1548.88 | 19.94 |
| 1550.81 | 19.91 |

TABLE 4-continued

Module gain of 100 mW pump

| Wavelength (nm) | Module gain (dB) |
|---|---|
| 1553.85 | 20.1 |
| 1555.41 | 20.2 |
| 1557.24 | 20.17 |
| 1558.88 | 19.98 |
| 1560.29 | 19.58 |
| 1562.05 | 18.89 |

According to Formula (4) and (5), the gain of Erbium-doped fiber can be calculated as shown in Tables 5 and 6:

TABLE 5 the gain of Erbium-doped fiber for 46 mW pump

| Wavelength (nm) | the gain of Erbium-doped fiber (dB) |
|---|---|
| 1529.50 | 18.03 |
| 1530.51 | 18.46 |
| 1531.68 | 18.77 |
| 1533.25 | 18.65 |
| 1534.52 | 18.05 |
| 1536.39 | 17.08 |
| 1537.91 | 16.74 |
| 1539.60 | 16.90 |
| 1541.24 | 17.25 |
| 1542.72 | 17.64 |
| 1544.48 | 17.87 |
| 1545.98 | 18.05 |
| 1547.76 | 18.08 |
| 1548.88 | 18.11 |
| 1550.81 | 18.20 |
| 1553.85 | 18.52 |
| 1555.41 | 18.64 |
| 1557.24 | 18.74 |
| 1558.88 | 18.64 |
| 1560.29 | 18.35 |
| 1562.05 | 17.82 |

TABLE 6 the gain of Erbium-doped fiber for 100 mW pump

| Wavelength (nm) | the gain of Erbium-doped fiber (dB) |
|---|---|
| 1529.50 | 23.58 |
| 1530.51 | 23.95 |
| 1531.68 | 24.14 |
| 1533.25 | 23.73 |
| 1534.52 | 22.78 |
| 1536.39 | 21.28 |
| 1537.91 | 20.64 |
| 1539.60 | 20.64 |
| 1541.24 | 20.92 |
| 1542.72 | 21.26 |
| 1544.48 | 21.40 |
| 1545.98 | 21.48 |
| 1547.76 | 21.39 |
| 1548.88 | 21.36 |
| 1550.81 | 21.33 |
| 1553.85 | 21.50 |
| 1555.41 | 21.57 |
| 1557.24 | 21.58 |
| 1558.88 | 21.39 |
| 1560.29 | 20.98 |
| 1562.05 | 20.31 | process the data in Tables 5 and 6 according to Formula (II), and adjust doped fiber length and population inversion coefficient x to reach a Erbium-doped fiber gain of 18 dB (corresponding to a module gain of about 16.6 dB) as well as gain spectrum shapes related to different doped fiber lengths as shown in Table 7:

TABLE 7

Gain spectrum data related to different doped fiber lengths

| | Length of Erbium-doped fiber (m) | | | | |
|---|---|---|---|---|---|
| | 8.3 | 8.7 | 9.2 | 9.8 | 10.5 |
| | | | Min Gain(dB) | | |
| | 18.01 | 18.01 | 18.03 | 18.00 | 17.99 |
| | | | x | | |
| | 0.86 | 0.59 | 0.33 | 0.04 | −0.25 |
| Wavelength(nm) | Er Gain(dB) | Er Gain(dB) | Er Gain(dB) | Er Gain(dB) | Er Gain(dB) |
| 1529.50 | 20.57 | 20.15 | 19.86 | 19.44 | 18.99 |
| 1530.51 | 20.91 | 20.52 | 20.27 | 19.90 | 19.50 |
| 1531.68 | 21.10 | 20.75 | 20.54 | 20.22 | 19.89 |
| 1533.25 | 20.77 | 20.47 | 20.33 | 20.08 | 19.84 |
| 1534.52 | 19.95 | 19.71 | 19.61 | 19.43 | 19.25 |
| 1536.39 | 18.67 | 18.50 | 18.47 | 18.37 | 18.30 |
| 1537.91 | 18.13 | 18.01 | 18.03 | 18.00 | 17.99 |
| 1539.60 | 18.15 | 18.07 | 18.13 | 18.16 | 18.22 |
| 1541.24 | 18.41 | 18.36 | 18.46 | 18.53 | 18.64 |
| 1542.72 | 18.72 | 18.70 | 18.83 | 18.94 | 19.10 |
| 1544.48 | 18.86 | 18.87 | 19.03 | 19.19 | 19.39 |
| 1545.98 | 18.95 | 18.98 | 19.18 | 19.37 | 19.62 |
| 1547.76 | 18.88 | 18.94 | 19.17 | 19.40 | 19.69 |
| 1548.88 | 18.86 | 18.94 | 19.18 | 19.43 | 19.74 |

TABLE 7-continued

Gain spectrum data related to different doped fiber lengths

| | Length of Erbium-doped fiber (m) | | | | |
|---|---|---|---|---|---|
| | 8.3 | 8.7 | 9.2 | 9.8 | 10.5 |
| | | | Min Gain(dB) | | |
| | 18.01 | 18.01 | 18.03 | 18.00 | 17.99 |
| | | | x | | |
| Wavelength(nm) | 0.86 Er Gain(dB) | 0.59 Er Gain(dB) | 0.33 Er Gain(dB) | 0.04 Er Gain(dB) | −0.25 Er Gain(dB) |
| 1550.81 | 18.85 | 18.96 | 19.23 | 19.52 | 19.88 |
| 1553.85 | 19.02 | 19.18 | 19.50 | 19.85 | 20.29 |
| 1555.41 | 19.09 | 19.26 | 19.61 | 19.98 | 20.44 |
| 1557.24 | 19.11 | 19.31 | 19.68 | 20.08 | 20.58 |
| 1558.88 | 18.95 | 19.16 | 19.55 | 19.97 | 20.49 |
| 1560.29 | 18.60 | 18.82 | 19.22 | 19.66 | 20.19 |
| 1562.05 | 18.01 | 18.24 | 18.64 | 19.09 | 19.63 |

Subtract the minimum gain, and then get the spectrum shapes (as shown in Drawing 9) of gain flattening filter (GFF) relevant to the doped fiber length. The data is described in Table 8:

TABLE 8 insertion loss of GFF relevant to different fiber lengths

| | Er Fiber Length (m) | | | | |
|---|---|---|---|---|---|
| Wavelength (nm) | 8.3 GFF Insertion Loss(dB) | 8.7 GFF Insertion Loss(dB) | 9.2 GFF Insertion Loss(dB) | 9.8 GFF Insertion Loss(dB) | 10.5 GFF Insertion Loss(dB) |
| 1529.50 | 2.56 | 2.14 | 1.83 | 1.44 | 1.00 |
| 1530.51 | 2.91 | 2.51 | 2.24 | 1.90 | 1.51 |
| 1531.68 | 3.09 | 2.74 | 2.52 | 2.23 | 1.90 |
| 1533.25 | 2.76 | 2.46 | 2.30 | 2.08 | 1.84 |
| 1534.52 | 1.95 | 1.70 | 1.58 | 1.43 | 1.26 |
| 1536.39 | 0.66 | 0.49 | 0.44 | 0.37 | 0.30 |
| 1537.91 | 0.12 | 0.00 | 0.00 | 0.00 | 0.00 |
| 1539.60 | 0.14 | 0.06 | 0.11 | 0.16 | 0.23 |
| 1541.24 | 0.40 | 0.35 | 0.43 | 0.53 | 0.65 |
| 1542.72 | 0.71 | 0.69 | 0.81 | 0.95 | 1.11 |
| 1544.48 | 0.85 | 0.86 | 1.01 | 1.19 | 1.40 |
| 1545.98 | 0.94 | 0.98 | 1.15 | 1.38 | 1.63 |
| 1547.76 | 0.87 | 0.94 | 1.15 | 1.40 | 1.70 |
| 1548.88 | 0.85 | 0.93 | 1.16 | 1.43 | 1.75 |
| 1550.81 | 0.84 | 0.95 | 1.21 | 1.52 | 1.89 |
| 1553.85 | 1.01 | 1.17 | 1.48 | 1.86 | 2.29 |
| 1555.41 | 1.08 | 1.26 | 1.58 | 1.98 | 2.45 |
| 1557.24 | 1.10 | 1.30 | 1.65 | 2.09 | 2.59 |
| 1558.88 | 0.94 | 1.16 | 1.52 | 1.97 | 2.50 |
| 1560.29 | 0.59 | 0.81 | 1.19 | 1.66 | 2.20 |
| 1562.05 | 0.00 | 0.23 | 0.61 | 1.09 | 1.63 |

Therefore, gain spectrums of the doped optical fiber with various fiber length can be acquired by measuring spectrum shapes at two gain point (H, L) of the optical doped fiber in certain fiber length and applying change rule of gain spectrum of the doped optical fiber in different population inversion level, which improves the flexibility for design of amplifier.

Figure 2:
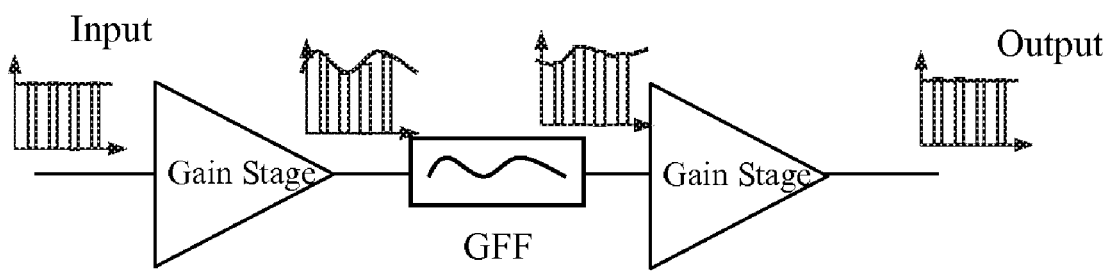
FIG. 2 is a schematic diagram of an optical path of another typical optical amplifier with a gain flattening filter (GFF), showing transforming processes of spectrum shape in the optical path.
Figure 4:
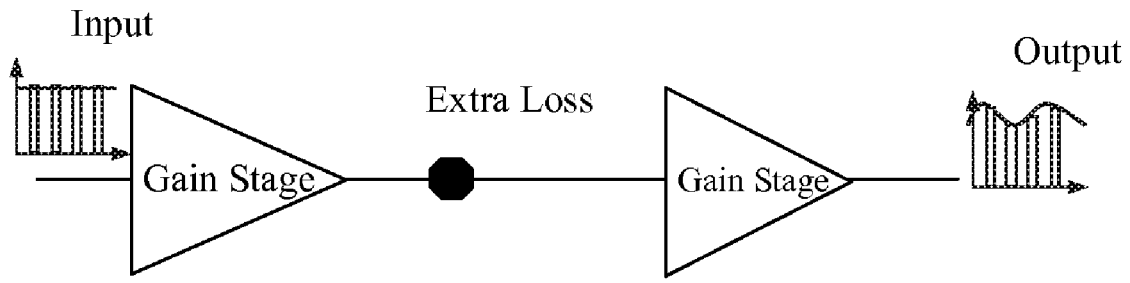
FIG. 4 illustrates an optical path for analyzing spectrum shape of a gain flattening filter (GFF) in another optical amplifier shown in FIG. 2 in accordance with the present invention.

FIG. 2 is the optical path diagram applied for the second embodiment of this invention. FIG. 4 shows the corresponding optical configuration and testing points of GFF spectrum shape. It is flexible to select the pumping methods, position of GFF, and doped optical fiber etc, for which you can refer to the descriptions as required for the first optical path diagram. This diagram is a common two stages structure. You can get the optical configuration of GFF more than two stages by analogy. Their data processing methods are basically the same as the first optical path diagram.

In another embodiment of the invention, Thulium-doped fiber is spliced to the optical fiber amplifier and forms a Thulium-doped fiber amplifier. Given a certain level of population inversion, the expression of gain spectrum of a Thulium-doped optical fiber with certain length is as follows:

$$TmGain(\lambda)=[g(\lambda)*inv-alpha(\lambda)*(1-inv)]*L \quad (21)$$

In the above expression, Gain($\lambda$) refers to the spectral function of gain, g($\lambda$) is the spectral function of emission coefficient, alpha($\lambda$) is the spectral function of absorption coefficient, inv refers to the population inversion level in Thulium-doped fiber, and L is the length of Thulium-doped optical fiber.

For a ready-made amplifier, the module gain is equal to Thulium-doped optical fiber gain minus the passive loss:

$$ModuleGain(\lambda)=TmGain(\lambda)-PassiveLoss(\lambda) \quad (22)$$

equal to:

$$TmGain(\lambda)=ModuleGain(\lambda)+PassiveLoss(\lambda) \quad (23)$$

PassiveLoss($\lambda$) is generally invariable. To get PassiveLoss($\lambda$), all of main optical paths shall be spliced without the Thulium-doped optical fiber, Then, PassiveLoss($\lambda$) of optical amplifier module can be measured.

After PassiveLoss($\lambda$) is achieved, the Thulium-doped fiber can be spliced, and the gain spectrum of the module can be tested with OSA(optical spectrum analyzer): 1. connecting the input light to the OSA, scanning the input optical spectrum; 2. connecting the input light to the input port of the module and connecting the output port of the module to the OSA; 3. scanning the output optical spectrum.

To adopt the methods specified in this invention, it is necessary to measure the two module gain spectrums near the target gain. The two module gain spectrums is respectively referred to as ModuleHGain($\lambda$) and ModuleLGain($\lambda$). Two gain spectrums of Thulium-doped fiber can be achieved according to Expression (23):

$$TmHGain(\lambda)=ModuleHGain(\lambda)+PassiveLoss(\lambda) \quad (24)$$

$$TmLGain(\lambda)=ModuleLGain(\lambda)+PassiveLoss(\lambda) \quad (25)$$

$$TmHGain(\lambda)=[g(\lambda)*invH-alpha(\lambda)*(1-invH)]*L \quad (26)$$

$$TmLGain(\lambda)=[g(\lambda)*invL-alpha(\lambda)*(1-invL)]*L \quad (27)$$

Expression (26) minus expression (27), which is equal to:

$$TmHGain(\lambda)-TmLGain(\lambda)=g(\lambda)(invH-invL)+ alpha(\lambda)(invH-invL) \quad (28)$$

Therefore, the relationship between the variation in gain spectrum and the variation in population inversion level is achieved as follows:

$$\Delta TmGain(\lambda)=[G(\lambda)+alpha(\lambda)]*\Delta inv=K(\lambda)*\Delta inv \quad (29)$$

When population inversion level changes by $\Delta'inv$, the amount of variation in gain spectrum of Thulium-doped fiber is as follows:

$$\Delta TmGain(\lambda)=K(\lambda)*\Delta'inv=\Delta TmGain(\lambda)*\Delta'inv/\Delta inv=[TmHGain(\lambda)-TmLGain(\lambda)]*x \quad (30)$$

In the above expression, x is $\Delta'inv/\Delta inv$. If L' is assumed as the proportion of doped fiber length, the gain in Thulium-doped fiber can be gotten regardless of length of doped fiber and variation of population inversion level:

$$TmGain(\lambda,x,L')=[TmLGain(\lambda)+[TmHGain(\lambda)-TmLGain(\lambda)]*x]*L' \quad (31)$$

If the length of doped fiber is fixed, a series of spectral shapes can be gotten by adjusting the population inversion level. Thulium-doped fiber gain spectrum shapes are gotten by adjusting the pump power when the length of doped fiber is fixed. When both the doped fiber length and the population inversion level are adjusted in the mean time, for each doped fiber length, population inversion level can be found accordingly, which can make the minimum point of gain spectrum reach the target gain. In this way, a group of population inversion level corresponding to the doped fiber length can be found. Furthermore, a group of insertion loss spectrum of gain flattening filter (GFF) also can be found necessary for achieving the target gain.

From the above embodiments of the invention, integrating the expressions:

$$ErGain(\lambda,x,L')=[ErLGain(\lambda)+[ErHGain(\lambda)-ErLGain(\lambda)]*x]*L' \text{ and}$$

$$TmGain(\lambda,x,L')=[TmLGain(\lambda)+[TmHGain(\lambda)-TmLGain(\lambda)]*x]*L',$$

an expression:

$$Gain(\lambda,x,L')=[LGain(\lambda)+[HGain(\lambda)-LGain(\lambda)]*x]*L' \quad (41)$$

is achieved, which adapts to doped fiber amplifier with any doped material.

What is claimed is:

1. A method for acquiring spectrum shape of a gain flattening filter of a doped optical fiber amplifier, the method comprising the steps of:
   measuring spectrum shapes at two gain point (H, L) of the doped optical fiber with invariable fiber length respectively; and
   acquiring various gain spectrums of the doped optical fiber with various fiber length and various population inversion level and then acquiring corresponding shape of a gain flattening filter according to an expression:

$$Gain(\lambda,x,L')=[LGain(\lambda)+[HGain(\lambda)-LGain(\lambda)]*x]*L';$$

Wherein Gain ($\lambda$) refers to the spectral function of gain, x is $\Delta'inv/\Delta inv$ which refers to change of population inversion level, and L' is set as proportion of doped fiber length.

2. The method of claim 1 comprising the steps of:
   adjusting an input spectrum and testing the flattening input spectrum;
   measuring the passive loss spectrum of the gain flattening filter and the optical fiber amplifier;
   splicing an doped fiber to the optical fiber amplifier and forming an doped fiber amplifier, adjusting the pump power to make the module gain close to the target gain, and measuring the module gain spectrum at two population inversion level (H, L);
   calculating the gain of doped fiber amplifier according to Formulas:

$$HGain(\lambda)=ModuleHGain(\lambda)+PassiveLoss(\lambda) \text{ and}$$

$$LGain(\lambda)=ModuleLGain(\lambda)+PassiveLoss(\lambda);$$

adjusting different doped fiber length and population inversion coefficient x, and acquiring various gain spectrums of the doped optical fiber with various corresponding fiber length according to Formula:

$$Gain(\lambda,x,L')=[LGain(\lambda)+[HGain(\lambda)-LGain(\lambda)]*x]*L'; \text{ and}$$

Subtracting minimum gain from gain spectrum of the doped optical fiber, and then acquiring a spectrum shape of the gain flattening filter corresponding to a doped fiber length.

3. The method of claim 1 comprising the steps of:
   adjusting an input spectrum and testing the flattening input spectrum;
   splicing an doped fiber to the optical fiber amplifier and forming an doped fiber amplifier, adjusting the pump power to make the module gain close to the target gain, and measuring the module gain spectrum at two population inversion level (H, L);
   removing the doped fiber and measuring the passive loss spectrum of the gain flattening filter and the optical fiber amplifier;
   calculating the gain of doped fiber amplifier according to Formulas:

$$HGain(\lambda)=ModuleHGain(\lambda)+PassiveLoss(\lambda) \text{ and}$$

$$LGain(\lambda)=ModuleLGain(\lambda)+PassiveLoss(\lambda);$$

adjusting different doped fiber length and population inversion coefficient x, and acquiring various gain spectrums of the doped optical fiber with various corresponding fiber length according to Formula:

$$Gain(\lambda,x,L')=[LGain(\lambda)+[HGain(\lambda)-LGain(\lambda)]*x]*L'; \text{ and}$$

Subtracting minimum gain from gain spectrum of the doped optical fiber, and then acquiring a spectrum shape of the gain flattening filter corresponding to a doped fiber length.

4. A method for acquiring spectrum shape of a gain flattening filter of an Erbium-doped optical fiber amplifier, the method comprising the steps of:
   measuring spectrum shapes at two gain point (H, L) of the Erbium-doped optical fiber with invariable fiber length respectively; and
   acquiring various gain spectrums of the Erbium-doped optical fiber with various fiber length and various population inversion level, and then acquiring corresponding shape of a gain flattening filter according to an expression:

$$ErGain(\lambda,x,L')=[ErLGain(\lambda)+[ErHGain(\lambda)-ErLGain(\lambda)]*x]*L';$$

Wherein Gain (λ) refers to the spectral function of gain, x is Δ'inv/Δinv which refers to change of population inversion level, and L' is set as proportion of doped fiber length.

5. The method of claim 4 comprising the steps of:
adjusting an input spectrum and testing the flattening input spectrum;
measuring the passive loss spectrum of the gain flattening filter and an optical fiber amplifier;
splicing an Erbium-doped fiber to the optical fiber amplifier and forming the Erbium-doped fiber amplifier, adjusting the pump power to make the module gain close to the target gain, and measuring the module gain spectrum at two population inversion level (H, L);
calculating the gain of Erbium-doped fiber amplifier according to Formulas:

ErHGain(λ)=ModuleHGain(λ)+PassiveLoss(λ) and

ErLGain(λ)=ModuleLGain(λ)+PassiveLoss(λ);

adjusting different Erbium-doped fiber length and population inversion coefficient x, and acquiring various gain spectrums of the Erbium-doped optical fiber with various corresponding fiber length according to Formula:

ErGain(λ,x,L')=[ErLGain(λ)+[ErHGain(λ)−ErLGain(λ)]*x]*L'; and

Subtracting minimum gain from gain spectrum of the Erbium-doped optical fiber, and then acquiring a spectrum shape of the gain flattening filter corresponding to an Erbium-doped fiber length.

6. The method of claim 4 comprising the steps of:
adjusting an input spectrum and testing the flattening input spectrum;
splicing an Erbium-doped fiber to an optical fiber amplifier and forming the Erbium-doped fiber amplifier, adjusting the pump power to make the module gain close to the target gain, and measuring the module gain spectrum at two population inversion level (H, L);
removing the Erbium-doped fiber and measuring the passive loss spectrum of the gain flattening filter and the optical fiber amplifier;
calculating the gain of Erbium-doped fiber amplifier according to Formulas:

ErHGain(λ)=ModuleHGain(λ)+PassiveLoss(λ) and

ErLGain(λ)=ModuleLGain(λ)+PassiveLoss(λ);

adjusting different Erbium-doped fiber length and population inversion coefficient x, and acquiring various gain spectrums of the doped optical fiber with various corresponding fiber length according to Formula:

ErGain(λ,x,L')=[ErLGain(λ)+[ErHGain(λ)−ErLGain(λ)]*x]*L'; and

Subtracting minimum gain from gain spectrum of the Erbium-doped optical fiber, and then acquiring a spectrum shape of the gain flattening filter corresponding to an Erbium-doped fiber length.

7. A method for acquiring spectrum shape of a gain flattening filter of a Thulium-doped optical fiber amplifier, the method comprising the steps of:
measuring spectrum shapes at two gain point (H, L) of the Thulium-doped optical fiber with invariable fiber length respectively; and
acquiring various gain spectrums of the Thulium-doped optical fiber with various fiber length and various population inversion level, and then acquiring corresponding shape of a gain flattening filter according to an expression:

TmGain(λ,x,L')=[TmLGain(λ)+[TmHGain(λ)−TmLGain(λ)]*x]*L';

Wherein Gain (λ) refers to the spectral function of gain, x is Δ'inv/Δinv which refers to change of population inversion level, and L' is set as proportion of doped fiber length.

8. The method of claim 7 comprising the steps of:
adjusting an input spectrum and testing the flattening input spectrum;
measuring the passive loss spectrum of the gain flattening filter and an optical fiber amplifier;
splicing a Thulium-doped fiber to the optical fiber amplifier and forming the Thulium-doped fiber amplifier, adjusting the pump power to make the module gain close to the target gain, and measuring the module gain spectrum at two population inversion level (H, L);
calculating the gain of Thulium-doped fiber amplifier according to Formulas:

TmHGain(λ)=ModuleHGain(λ)+PassiveLoss(λ) and

TmLGain(λ)=ModuleLGain(λ)+PassiveLoss(λ);

adjusting different Thulium-doped fiber length and population inversion coefficient x, and acquiring various gain spectrums of the Thulium-doped optical fiber with various corresponding fiber length according to Formula:

TmGain(λ,x,L')=[TmLGain(λ)+[TmHGain(λ)−TmLGain(λ)]*x]*L'; and

Subtracting minimum gain from gain spectrum of the Thulium-doped optical fiber, and then acquiring a spectrum shape of the gain flattening filter corresponding to a Thulium-doped fiber length.

9. The method of claim 7 comprising the steps of:
adjusting an input spectrum and testing the flattening input spectrum;
splicing a Thulium-doped fiber to an optical fiber amplifier and forming the Thulium-doped fiber amplifier, adjusting the pump power to make the module gain close to the target gain, and measuring the module gain spectrum at two population inversion level (H, L);
removing the Thulium-doped fiber and measuring the passive loss spectrum of the gain flattening filter and the optical fiber amplifier;
calculating the gain of Thulium-doped fiber amplifier according to Formulas:

TmHGain(λ)=ModuleHGain(λ)+PassiveLoss(λ) and

TmLGain(λ)=ModuleLGain(λ)+PassiveLoss(λ);

adjusting different Thulium-doped fiber length and population inversion coefficient x, and acquiring various gain spectrums of the doped optical fiber with various corresponding fiber length according to Formula:

TmGain(λ,x,L')=[TmLGain(λ)+[TmHGain(λ)−TmLGain(λ)]*x]*L'; and

Subtracting minimum gain from gain spectrum of the Thulium-doped optical fiber, and then acquiring a spectrum shape of the gain flattening filter corresponding to a Thulium-doped fiber length.

* * * * *